Jan. 5, 1943.   M. J. JOHNSON   2,307,135
POTENTIOMETER
Filed April 6, 1940
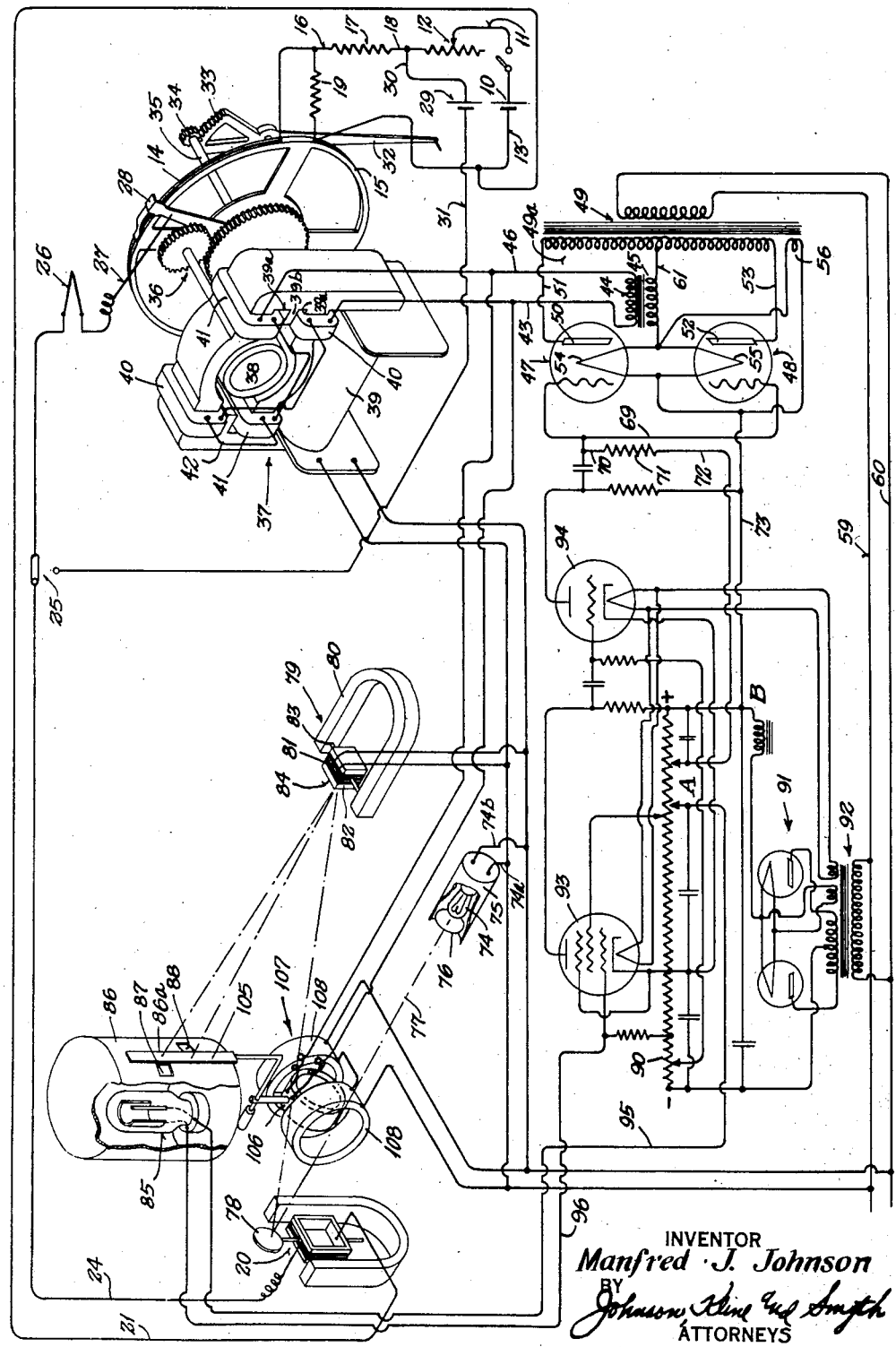
INVENTOR
Manfred J. Johnson
BY
Johnson Kline and Smyth
ATTORNEYS Patented Jan. 5, 1943

2,307,135

UNITED STATES PATENT OFFICE 2,307,135

POTENTIOMETER

Manfred J. Johnson, Naugatuck, Conn.

Application April 6, 1940, Serial No. 328,364

12 Claims. (Cl. 171—95)

This invention relates to potentiometer systems and the like, and, more particularly, to a means for quickly balancing the potentiometer to indicate and record unknown quantities, such as temperature, without objectionable hunting.

An object of this invention is to provide an improved control for recording potentiometers and the like which will quickly and accurately indicate changes in a condition and which can be made very small and compact.

In carrying out the above object, the present invention provides the potentiometer circuit with a novel balancing means and control system utilizing solely one photosensitive cell and a novel movable barrier for controlling the illumination of the photosensitive cell by the light beam.

This present application is an improvement on my copending application Serial No. 231,277, filed September 22, 1938, in which a single light source is directed, through suitably controlled mechanism, to illuminate a photosensitive cell in accordance with the change in a condition at predetermined timed intervals with respect to the energization of a shaded pole motor.

A pair of thermionic devices are connected in the motor circuit and have their plates energized alternately with charges of opposite polarity so that one or the other is capable of conducting current upon the grid of the tube being controlled.

This control is accomplished by the illuminated photocell supplying a charge in proper timed relation, with the energization of the tubes so that one or the other will become conductive to supply the current necessary to load the shading coils and cause the motor to rotate in one direction or the other.

According to the present invention, however, a novel motor system is employed in which a plurality of wire wound coils are mounted on the motor frame in a manner similar to shading coils of said copending application. However, the coils of each diagonal pair are connected so as to produce north and south poles mechanically displaced with respect to the main field, and the two pairs of coils are connected in series so that the induced voltage in the coils is zero, and the inductance of the circuit is zero during normal operation so that if a measurement was taken across the circuit it would indicate that there was pure resistance in the circuit.

The coils are coupled to a supply line of A. C. current to supply the necessary operating current. The circuit is controlled by means of the thermionic devices which are operated in a manner similar to that disclosed in my prior application.

One of the advantages of this motor over the shaded pole motor disclosed in my copending application is that it does not depend upon the transformer action of the pole pieces and shading coils to energize the controlling coils but energizes them from an outside source of supply, which source of supply can be readily controlled.

With the motor so constructed and controlled by the thermionic devices regulated in accordance with the illumination of the photocell, it can be operated on small currents in the thermionic circuit and thus respond quickly to small changes in the condition which will slightly illuminate the cell and render the tubes conductive to a limited extent.

Another feature of the present invention resides in the provision of a movable barrier controlled in accordance with the energization of the balancing motor to move so as to partially cover the aperture as the motor speeds up and when a balance is approached and the motor slows down will move back slowly and tend to extend the normal barrier in the shield into the aperture so as to anticipate balance being attained and prevent overrunning.

Other features and advantages will hereinafter appear.

In the drawing:

The figure shows a diagrammatic view of the system showing the motor and movable barrier and the connections therefor.

In the preferred form of the invention, referring now to the system diagrammatically shown in the drawing, the potentiometer circuit, which is used with the thermocouple or other source of voltage variable according to a change of condition, includes a primary source of energy in the form of a battery 10 which is connected by means of a wire 11 to a variable calibrating resistance 12, and by means of a wire 13 to one end of a slide wire 14 mounted on the periphery of a stationary disk 15. The other end of the slide wire 14 is connected by a wire 16 to a resistor 17 which in turn is connected by a wire 18 to the other end of the calibrating resistance 12. A resistor 19 is shunted across the slide wire 14 for the purpose of reducing the voltage drop across the latter. A complete circuit is thus formed through the slide wire 14, shunted resistance 19, the resistor 17, the calibrating resistance 12 and the battery 10.

A galvanometer 20 is attached by means of a wire 21, and a wire 24, through a switch 25, to a thermocouple 26, which, in turn, is connected by a wire 27 to a movable contact 28 which moves around the disk 15 and contacts with the slide wire 14.

Thus, the galvanometer 20 and the thermocouple 26 are shunted across a portion of the slide wire 14 as determined by the position of the movable contact 28, and it is possible, by adjustment of said contact and the calibrating resistance 12, to secure a balanced condition such that no deflection of the galvanometer results. For the purpose of checking the potential drop across the slide wire 14 of the potentiometer circuit, just described, a standard cell 29 is connected by means of a wire 30 to the wire 18, and by means of a wire 31 to an alternative contact of the switch 25.

It will be readily understood that, for a condition of no deflection of the galvanometer 20, the movable contact 28 may have various positions, these positions corresponding to various temperatures to which the thermocouple 26 is subjected. A pointer 32 has one end rigidly connected to a gear segment 33 in mesh with a gear 34 carried by the shaft 35. The shaft is connected to the movable contact 28, and, therefore, various positions of the pointer 32 may be made to indicate various temperatures of the thermocouple 26.

In my copending application, a shaded pole reversible alternating current motor, controlled by thermionic devices in accordance with the movements of the galvanometer, is employed to move the contact of the slide wire. According to the present invention, however, the contact 28 and shaft upon which it is mounted are driven through suitable gearing 36 by a novel reversible A. C. motor 37 having a rotor 38 and a continuously energized A. C. field 39, which motor and control per se is described and claimed in my application Serial No. 328,266, filed April 6, 1940.

As shown in the drawing, the pole pieces of the motor are constructed so as to form a closed magnetic circuit. At each side of the rotor, the pole pieces have two slots 39a formed in their faces and opening toward the rotor so as to leave a projecting portion 39b or tooth therebetween at each side of the rotor and in substantial alignment.

According to the present invention, a pair of wound coils 40 are diagonally disposed on the pole pieces so that each has one leg in one of the slots 39a. These coils are connected together in series so as to produce a north and south pole mechanically displaced from the main field. A similar pair of coils 41 are mounted on the pole pieces and each positioned with one leg thereof in the diagonally opposed slots and are also connected in series so as to produce a north and south pole mechanically displaced from the main field. The two sets of coils are then connected in series by a wire 42 in such a manner that they are in opposition to one another so that the resultant induced voltage of the circuit will be zero. In other words, if a measurement was taken across the circuit, it would indicate a pure resistance in the circuit.

When current is passed through the series-connected coils in predetermined time out of phase relation with the energization of the A. C. field, it will coact with the main field and set up a rotating field having its direction of rotation determined by the displacement of the field set up by the coils, either leading or lagging with respect to the field set up by the A. C. coil 39, and the rotor will turn in a corresponding direction.

In order to control the energization of the coils 40, 41 producing the controlling field, the present invention connects one end of the series-connected coils through a wire 43 to one end of the secondary coil 44 of a transformer 45. The other end of the secondary coil is connected through the wire 46 to the coil 41. The transformer 45 couples the coils 40, 41 to a pair of thermionic devices 47, 48 to be energized thereby.

In the illustrated form of the invention, these thermionic devices are shown to be three electrode tubes of the type comprising a filament, a plate and a grid. It is to be understood, however, that other thermionic tubes, which can readily control a circuit, may be used.

A power supply transformer 49 is connected across the power line 59, 60 and the secondary of the transformer coil 49a has one end connected to plate 50 of the thermionic devices 47 through wire 51 and the other end of the coil is connected to plate 52 of the thermionic device 48 through a wire 53. The filaments 54 and 55 of the thermionic devices are connected across another secondary coil 56 of the transformer 49 to be energized thereby. The power line which supplies the A. C. current to the transformer also energizes the motor field 39. The midpoint of secondary coil 49a is connected to the filament circuit by a wire 61 and the primary of the transformer 45 is connected in this wire so as to control the energization of the field coils. When the devices 47, 48 are so connected, the plates 50 and 52 will have impressed thereon, charges of opposite polarity except at the instant when the alternating wave goes through zero and the plates will also be of opposite polarity to the filament.

The grids of the thermionic devices 47 and 48 are connected together by a wire 69, and this wire is connected through a wire 70 and a suitable grid resistor 71 and a wire 72 to the point A representing the negative side of a suitable source of direct current energy supply to be hereinafter described. The positive side of the source of D. C. energy, as designated by point B, is connected by a wire 73 to the filaments of the thermionic devices, and, therefore, the grids of said devices have impressed on them a negative charge with respect to the filaments, the magnitude of which charge is sufficient to normally render the devices inoperative to load the controlling field.

It may be seen that by impressing at properly timed intervals a suitable positive charge on the grids of the thermionic devices 47 and 48, that device, which has its plate positive during said intervals, will be made to function and will, through the transformer coupling means, supply a proper current to the coils which, as will be explained, will be electrically out of phase with the energization of coil 39 to produce a rotating field and cause rotation of the motor in a proper direction.

As described in my copending application, the means for controlling rotation of the motor directionally in accordance with the direction of deflection of a deflectable member includes means for causing the thermionic devices 47 and 48 to function, using solely one photosensitive cell by impressing charges on the grids of these devices in accordance with the off-zero movements of the galvanometer 20, such that deflection of the galvanometer in one direction will cause to function one of the thermionic devices, and deflection of the galvanometer in the other direction will cause to function the other of the thermionic devices.

This is accomplished by means of a beam of light reflected by a mirror attached to the galvanometer and reflected through a synchronous vibrating unit including a mirror onto a photosensitive cell which is in circuit with the grids of the thermionic devices.

In the illustrated embodiment of the invention, there is provided a light source 74 which is preferably in the form of an incandescent bulb mounted in a casing 75 and connected through wires 74a and 74b, to the supply wires 59 and 60. The source of light 74 has a lens 76 associated therewith for directing a beam of light 77 against the mirror 78 attached to the coil of the galvanometer 20, and the light 74 and mirror 78 are so disposed that the beam of light reflected by the mirror 78 is directed to a vibrating unit 79 comprising a permanent magnet 80 having a moving coil 81 carried by a core 82 mounted on pivots 83 disposed between the poles thereof, which coil is connected to the supply wires 59 and 60. The moving coil 81 carries a small mirror 84 on the face of the core 82, and the vibrating unit 79 is so disposed that the beam of light reflected by the mirror 78 of the galvanometer 20 will be directed by the mirror 84 toward a photosensitive cell 85 of the emission type. The moving coil 81, which is connected to the supply wires 59 and 60, will oscillate in step with the alternating current wave, and, in so doing, will cause the mirror carried thereby to reflect the light in a form of a ribbon, as indicated by the double dot-and-dash lines in the drawing.

The photosensitive cell 85 is housed or screened by a casing 86 provided with two substantially small spaced apertures 87 and 88 which are so disposed as to occupy the positions of the positive and negative cycle of the alternating current wave. It will thus be seen that, if either of the apertures are illuminated by the oscillating beam, the photosensitive cell will be energized in timed relation with either the positive or negative half cycle of the wave.

The source of D. C. energy referred to above in the illustrated form of the invention comprises a bleeder resistance 90 connected across a conventional full wave rectifier 91 which is energized from the lines by means of a transformer 92.

A thermionic device 93, in the present preferred form of the invention, comprises a No. 57 tube, and a thermionic device 94, according to the present preferred form of the invention, comprises a No. 27 tube. These tubes are connected across the bleeder resistance 90 so as to receive their proper potentials therefrom and thus provide suitable control for the grids of the tubes 47, 48. These tubes have their heater filaments energized from the transformer 92.

One terminal of the photosensitive cell is connected to the bleeder resistance through a wire 95, while the other terminal of the cell is connected by a wire 96 to the grid of the thermionic device 93.

By so connecting the photosensitive cell 85 through the devices 93 and 94, there will be imposed on the grid circuits of the thermionic devices 47, 48, upon light striking said cell, a charge which will have the effect of causing said grids to be more positively charged in accordance with the extent of illumination of the cell, and, in some cases, even resulting in grids of zero or slightly positive polarity. From the academic viewpoint, a steady light, in striking the photosensitive cell 85, will so affect the grids that the thermionic devices 47 and 48 will function whenever their plates are positively charged, and, since these latter are in phase opposition, one device will begin to function as soon as the other device has stopped functioning, the devices alternately functioning in step with the alterations of the plate charges.

However, to effect directional control of the motor, the beam of light from the galvanometer 20 to the photosensitive cell 85 is oscillated by means of the synchronized vibrating device 79 in such a manner that light will strike the cell at properly timed intervals so as to cause to function only one of the thermionic devices. The particular device which will be caused to function, being according to the direction of deflection of the galvanometer, and for zero deflection of the galvanometer, the light, as explained, will be completely cut off from the cell. Thus, if the galvanometer is deflected to the left, light will strike the photosensitive cell only at those times during which a positively charged plate exists in that thermionic device which, when functioning, loads the coils of the motor with a current to produce an out-of-phase field so that the motor will rotate and move the contact 28 in the direction required to lessen the left deflection of the galvanometer. It follows, therefore, that a right deflection of the galvanometer would, as a consequence, make the photosensitive cell operate the other thermionic device which causes the motor to rotate the contact 28 so as to lessen the right deflection of the galvanometer. Thus, there is affected a balancing of the potentiometer circuit, and it is to be noted that frequency of oscillation of the light beam is sufficiently high so that movement of the motor in balancing the circuit is not a step-by-step movement, but is of a substantially continuous nature.

The apertures 87 and 88 are so disposed with respect to the shield 86 that the aperture 87 will permit light from the galvanometer, when deflected to the left, to strike the photosensitive cell 85 only during those periods when the plate of one of the thermionic devices is positive, and, therefore, when that device is in condition to function so as to cause rotation of the motor 37 and that thermionic device is chosen which will cause the contact 28 to move in a direction which will reduce the left deflection of the galvanometer. Therefore, the aperture 88 of the shield 86 will permit light from the galvanometer mirror, when deflected to the right, to strike the photosensitive cell only during those periods when the other of the thermionic devices is in a condition to function by virtue of its plate being positive and to cause a movement of the contact 28 such that the right deflection of the galvanometer will be lessened. Of course, for a balanced contact of the potentiometer circuit and zero position of the galvanometer, light from the mirror attached thereto will be prevented from striking the photosensitive cell 85 because of the obstruction offered to it by barrier 86a formed by the imperforate portion of the shield 86 intermediate the apertures 87 and 88.

As soon as a change in condition exists in the thermocouple circuit, the galvanometer will deflect and cause the beam to move into one or the other of the apertures to illuminate the cell.

As the light beam starts across the aperture, say for about a 5° change on a 2,000° scale, the charge imposed on the grid, due to the partial illumination of the photosensitive cell, will be sufficient to cause a slight voltage change on the grid and thereupon cause the tube to permit a small current in the control field and cause the motor to creep in a direction to balance the circuit to compensate for such change.

If the deflection is more than that produced by a 5° change so that the aperture is illuminated for a substantial extent, the motor will run at full speed.

In use, it is necessary that the control of the potentiometer be quick acting and accurate. This has been difficult to obtain in high speed recordings due to the fact that the inertia of the moving parts of the balancing motor and the nature of its control prevents quick stopping from being achieved without a certain amount of overthrow.

According to the present invention, means are provided for bringing the motor to a stop and in effect anticipating the approach of balanced condition. This is accomplished by providing a movable barrier 105 extending over the outer face of the shield. The movable barrier has a normal position in which it overlies and coincides with the fixed barrier 86a on the shield.

While the movable barrier may be operated in many ways, in the preferred form of the invention it is connected to a movable coil 106 of a dynamometer type instrument 107 for movement thereby. The fixed coils 108 of the instrument are connected across the A. C. supply lines 59, 60, while the movable coil 106 is connected to the wires 43, 46. With the movable coil thus connected in the control coil circuit, it will be seen that when the circuit is supplied with out-of-phase current for operating the motor and effecting a balance by rotation in one direction or the other, the movable coil will also be energized by the same out-of-phase current and will react with the fixed coils to cause the movable barrier 105 to move in either direction, according to the amount and phase relationship of the current supplied and cover the aperture which is being illuminated by the oscillating beam.

For very small changes in the condition being measured, which would supply but a small current to cause the motor to creep, the deflection of the movable barrier would be minute. However, for large changes in a condition, producing a substantial deflection of the beam which would bring the motor up to speed, the movable barrier will be moved to cover a substantial portion of the opening. The barrier, however, will not move far enough to cut off sufficient light from the aperture to cause the motor to operate at a speed less than full speed for full deflections of the galvanometer.

As a balance in the circuit is approached, due to the movement of the movable contact 28 over the slide wire, the galvanometer will gradually move the light back toward the barrier 86a to diminish the illumination of the photo-sensitive cell and decrease the charge impressed on the grid causing the energization of the motor to be diminished so that it gradually slows down. When this occurs, energization of the movable coil will be decreased and the barrier will slowly move back toward the fixed barrier of the shield.

It will be seen then that, by moving the barrier into the zone of the aperture, I have, in effect, moved the edge of the fixed barrier to meet the light beam as it returns. As the motor speed decreases, due to the decreasing illumination of the cell, caused by the light beam moving to neutral position, the movable barrier will also slowly move back and will, in effect, stop the motor just at the time that the balanced condition in the circuit exists so that overrunning of the motor will be effectively prevented.

Should the motor for some reason overrun slightly, then the barrier will be in position to cover the opposite aperture and, in effect, dampen any tendency of the light beam to cause reverse rotation of the motor.

It will be seen, therefore, that the motor will quickly and accurately be brought to stop without any overthrow upon the balanced condition being attained.

Variations and modifications may be made within the scope of this invention and portions of the improvements may be used without others.

I claim:

1. In a potentiometer system, a slide wire for balancing said system; a reversible A. C. motor for adjusting the slide wire; means for controlling the direction and extent of rotation of said motor including a single light beam controlled by the unbalance of the system, a photosensitive cell, and a circuit for operating the motor; and means actuated in response to the current flow in said circuit for regulating the illumination of the photosensitive cell to accurately control the operation of said motor.

2. In a potentiometer system, a slide wire; a reversible A. C. motor for adjusting the slide wire to balance said system; means for controlling the direction and extent of rotation of said motor including a photosensitive cell, a circuit controlled thereby for operating the motor, and a single light beam movable in accordance with the unbalance of the system to illuminate said cell; and means including a movable barrier actuated in response to the current flow in said circuit for reducing the illumination of the cell to slow down the motor as a balanced condition is approached to prevent overthrow of said motor.

3. In a potentiometer system, a slide wire; a galvanometer connected in circuit with the slide wire; an alternating current motor having a main continuously energized A. C. field and a controlling field for actuating the slide wire; means for supplying energy to the controlling field independently of said main field; means actuated in response to off-zero movement of the galvanometer for controlling the energizing means so as to supply energizing current to the control field out of phase with the energization of the main field to cause rotation of the said motor in a direction to adjust the slide wire to balance the circuit; and means actuated in response to the energy input of said controlling field for regulating said last-named means to prevent the motor from overrunning.

4. In a potentiometer system, a slide wire; a galvanometer connected in circuit with the slide wire; an alternating current motor having a main continuously energized A. C. field and a controlling field; means including thermionic devices connecting the controlling field to a source of energizing current that is independent of that for the main field; means operated in accordance with off-zero movement of the galvanometer to control the thermionic devices and regulate the time and quantity of energizing current supplied to the said control field, said means causing the current to be out of phase with the energization of the main field to rotate the motor in a direction to adjust the slide wire to balance the circuit; and means actuated in response to the current flow in the control field for regulating the operation of said thermionic devices so as to quickly stop said motor upon a balanced condition being attained.

5. In a potentiometer system, a slide wire; a galvanometer connected in circuit with the slide wire; an alternating current motor having a main continuously energized A. C. field and a controlling field comprising a plurality of mechanically displaced wound coils connected together in series so that the voltages induced therein are in opposition; means for energizing the coils from a separate source; and means actuated in response to off-zero movement of the galvanometer for controlling the energizing means so as to supply energizing current to the coils in timed out-of-phase relation with the energization of the main field to cause said motor to rotate in the desired direction to adjust the slide wire to balance the circuit.

6. In a potentiometer system, a slide wire; a galvanometer connected in circuit with the slide wire; an alternating current motor having pole pieces forming a closed magnetic circuit continuously energized by alternating current to produce a main field and a plurality of coils connected in series, so that the voltages induced therein are in opposition, mounted on the pole pieces so as to form a controlling field mechanically displaced from the main field; means for energizing the controlling field independently of said main field; and means actuated in response to off-zero movement of the galvanometer for controlling the energizing means so as to supply energizing current to the control field out of phase with the energization of the main field to cause rotation of the said motor in a direction to adjust the slide wire to balance the circuit.

7. In a potentiometer system, an alternating current motor having a continuously energizd main field, a rotor and a controlling field comprising a plurality of wound coils mechanically displaced from the main field and connected in series so that the induced voltages therein are zero; a slide wire and indicating means adjusted by the rotor; a galvanometer connected in circuit with the slide wire; means for connecting the controlling coils to an energizing means including a pair of normally inoperative thermionic devices; and means controlled in accordance with the magnitude and direction of the off-zero movement of the galvanometer for rendering one or the other of the thermionic devices conductive at a predetermined time out of phase with respect to the energization of the main field to supply the controlling field with current quantitative with regard to the off-zero movement to produce a field which either leads or lags with respect to the main field, depending upon the direction of the off-zero movement of the galvanometer, whereby the motor is rotated to adjust the slide wire to return the galvanometer to zero.

8. In a potentiometer system, an alternating current motor having a pole piece with a coil thereon continuously energized to form an alternating current field, a rotor and a controlling field comprising a plurality of wound coils mounted on the pole piece and mechanically displaced with respect to the main field, said coils being connected in series so that the induced voltage therein will balance; a slide wire adjusted by the rotor; a galvanometer connected in circuit with the slide wire; means for connecting the controlling coils to an energizing means including a pair of normally inoperative thermionic devices; and means controlled by off-zero movement of the galvanometer for rendering one or the other of the thermionic devices conductive at a predetermined time with respect to the energization of the main field to supply the controlling coils with current to produce a field which either leads or lags with respect to the main field, depending upon the direction of the off-zero movement of the galvanometer, whereby the motor is rotated to adjust the slide wire to return the galvanometer to zero.

9. In a potentiometer system, an alternating current motor having a pole piece forming a closed magnetic circuit and having two pairs of oppositely disposed slots, a coil mounted on the pole piece and continuously energized by alternating current to produce a main field, a rotor and a controlling field comprising a plurality of wound coils mounted with one leg in the slots so as to be mechanically displaced from the main field, and being connected in pairs to produce north and south poles with the pairs connected in opposition so that the voltage induced in the circuit will be zero; a slide wire adjusted by the rotor; a galvanometer connected in circuit with the slide wire; means for connecting the controlling coils to an energizing means including a pair of normally inoperative thermionic devices; and means controlled by off-zero movement of the galvanometer for rendering one or the other of the thermionic devices conductive at a predetermined time with respect to the energization of the main field to supply the controlling field with current to produce a field which either leads or lags with respect to the main field, depending upon the direction of the off-zero movement of the galvanometer, whereby the motor is rotated to adjust the slide wire to return the galvanometer to zero.

10. In a potentiometer system, an adjustable slide wire and circuit therefor including a deflectable member movable in either of opposite directions from a neutral position in response to energy change in the slide wire circuit; means for adjusting the slide wire including a reversible motor having an A. C. field and a controling field; means comprising a control circuit for energizing the controlling field including means for illuminating a light-sensitive cell to produce a pulsating current having a phase position dependent upon the direction of deflection of the deflectable member; means for selectively controlling the energization of the controlling field according to the phase position of the pulsating current to cause the controlling field to be energized in predetermined timed relation with the A. C. energization of the main field; and means for regulating the illumination of said cell operable in response to the direction and extent of current flowing in the controlling field to quickly bring the motor to a stop upon a balanced condition being attained without overrunning of the motor.

11. In a potentiometer system, an adjustable slide wire and circuit therefor; means for adjusting the slide wire including a reversible A. C. motor having a continuously energized A. C. field and a controlling field; means including a circuit for controlling the energization of the controlling field including a light-sensitive cell; a source of light; means for directing a beam of light from said source upon the light-sensitive cell; means in the slide wire circuit for deflecting said directing means to deflect the beam in either of opposite directions from a neutral position in response to a change in the slide wire circuit; means including a shield adjacent the light-sensitive cell having spaced apertures therein; means for periodically oscillating the light beam to cause it to periodically illuminate one or the other of the apertures dependent upon the direction of deflection of the deflecting means so that pulsating currents are set up and cause said controlling means to energize the controlling field in predetermined timed relation with the A. C. energization of the main field dependent upon the phase position of the pulsating current; and means disposed before the apertured shield and operable in response to the current flow in the circuit of the controlling field of the motor for regulating the opening of the aperture in the shield which is illuminated by the light beam in response to operation of the deflecting means to quickly bring the motor to a stop upon a balanced condition being attained without overrunning of the motor.

12. In a potentiometer system, an adjustable slide wire and circuit therefor; means for adjusting the slide wire including a reversible A. C. motor having a continuously energized A. C. field and a controlling field; control circuits connected with said controlling field; a light-sensitive cell connected to said control circuits; a source of light; means for directing a beam of light from said source upon the light-sensitive cell; a galvanometer connected in the slide wire circuit and operating said directing means to deflect the same in either of opposite directions from a neutral position in response to energy change in the slide wire circuit; means including a shield adjacent the light-sensitive cell having perforations therein; a periodically oscillated member for oscillating the light beam to periodically illuminate one of the perforations dependent upon the direction of deflection of the galvanometer so that pulsating currents are set up in the control circuits; means for selectively controlling energization of the controlling field according to the phase position of the pulsating current to cause the controlling field to be energized in predetermined timed relation with the A. C. energization of the main field; and means including a movable barrier disposed before the perforated shield and operable in response to current flow in the control circuits for the controlling field of the motor for regulating the aperture in the shield, which is illuminated by the light beam in response to deflection of the galvanometer, to regulate the illumination of the light-sensitive cell and quickly bring the motor to a stop without overrunning upon a balanced condition being attained.

MANFRED J. JOHNSON.